(12) United States Patent
Wen

(10) Patent No.: US 10,186,361 B2
(45) Date of Patent: Jan. 22, 2019

(54) DEVICE PREVENTING MISOPERATION OF VEHICLE ACCELERATION PEDAL

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Jin Wen, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 359 days.

(21) Appl. No.: 15/093,531

(22) Filed: Apr. 7, 2016

(65) Prior Publication Data
US 2017/0186522 A1    Jun. 29, 2017

(30) Foreign Application Priority Data
Dec. 24, 2015  (CN) .......................... 2015 1 0980560

(51) Int. Cl.
| H01H 9/00 | (2006.01) |
| H01H 47/00 | (2006.01) |
| H01H 51/22 | (2006.01) |
| H01H 51/30 | (2006.01) |
| H01F 7/06 | (2006.01) |
| B60Q 9/00 | (2006.01) |
| B60K 28/02 | (2006.01) |

(52) U.S. Cl.
CPC ............ *H01F 7/064* (2013.01); *B60K 28/02* (2013.01); *B60Q 9/00* (2013.01)

(58) Field of Classification Search
CPC ............ H01F 7/064; B60Q 9/00; B60Q 28/02
USPC .......................................................... 361/160
See application file for complete search history.

(56) References Cited

U.S. PATENT DOCUMENTS

| 3,888,219 | A | * | 6/1975 | Rogerson | ............... B60K 26/04 123/198 D |
| 5,586,457 | A | * | 12/1996 | Keener | ............... B60R 25/005 180/287 |
| 6,758,071 | B1 | * | 7/2004 | Reeb | ............... B60R 25/005 70/181 |
| 8,201,655 | B1 | * | 6/2012 | Haag | ............... B60R 25/005 180/287 |
| 2002/0027501 | A1 | * | 3/2002 | Yamanaka | ............... B60R 25/1025 340/426.1 |
| 2007/0125608 | A1 | * | 6/2007 | Tarasinski | ............... B60T 1/005 188/72.9 |
| 2015/0228267 | A1 | * | 8/2015 | Inoue | ............... G10K 11/175 381/71.4 |

* cited by examiner

*Primary Examiner* — Thienvu Tran
*Assistant Examiner* — Lucy Thomas
(74) *Attorney, Agent, or Firm* — ScienBiziP, P.C.

(57) ABSTRACT

A device preventing misoperation of a vehicle acceleration pedal includes an induction coil, a pedal arm, an electromagnet, and a processor. One end of the pedal arm fastens to the vehicle acceleration pedal, and the other end of the pedal arm inserts into the induction coil. The processor is electrically connected to the induction coil and the electromagnet and the pedal arm is magnetically attracted when the electromagnet is powered on by the processor, preventing the acceleration pedal being used as a brake pedal.

14 Claims, 3 Drawing Sheets

DEVICE PREVENTING MISOPERATION OF VEHICLE ACCELERATION PEDAL

CROSS-REFERENCE TO RELATED APPLICATIONS

This application claims priority to Chinese Patent Application No. 201510980560.2 filed on Dec. 24, 2015, the contents of which are incorporated by reference herein.

FIELD

The subject matter herein generally relates to vehicle safety, and more particularly, to a device preventing misapplication of a vehicle acceleration pedal.

BACKGROUND

A vehicle brake pedal and a vehicle acceleration pedal are usually juxtaposed such that a driver may control either one using the same foot. A driver needs to repeatedly move his foot between the two pedals during driving. A novice driver may by mistake press the accelerator pedal instead of the brake pedal.

BRIEF DESCRIPTION OF THE DRAWINGS

Implementations of the present disclosure will now be described, by way of example only, with reference to the attached figures.

DETAILED DESCRIPTION

Figure 1:
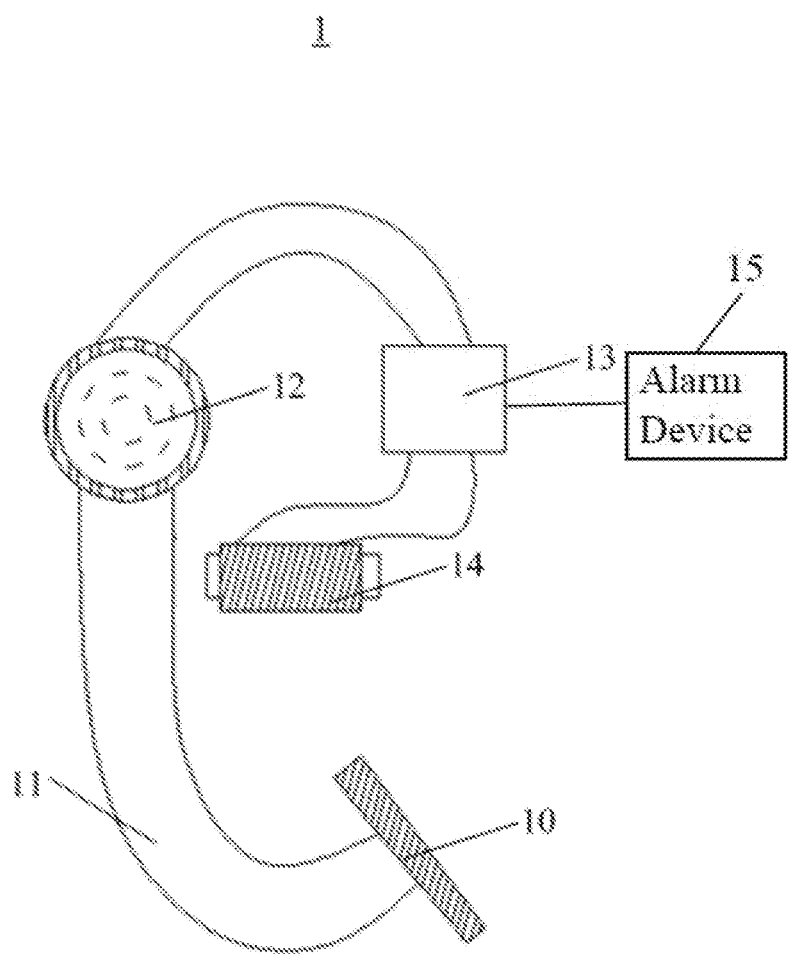
FIG. 1 is a diagrammatic view of a first embodiment of a device preventing misoperation of a vehicle acceleration pedal.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features. The present disclosure, including the accompanying drawings, is illustrated by way of examples and not by way of limitation.

Several definitions that apply throughout this disclosure will now be presented.

References to "a/an" or "one" embodiment in this disclosure are not necessarily to the same embodiment, and such references mean "at least one." The term "comprising" means "including, but not necessarily limited to"; it specifically indicates open-ended inclusion or membership in a so-described combination, group, series and the like.

FIG. 1 shows a first embodiment of a device 1 that can prevent misoperation of a vehicle acceleration pedal 10, where operation of a vehicle brake pedal (not shown) was the intended operation.

The device 1 can include a pedal arm 11, an induction coil 12, a processor 13, and an electromagnet 14. One end of the pedal arm 11 fastens to the vehicle acceleration pedal 10, and the other end of the pedal arm 11 inserts into the induction coil 12. The processor 13 electrically connects to the induction coil 12 and the electromagnet 14. The pedal arm 11 is made from a magnetic material. When the electromagnet 14 is powered on by the processor 13, the electromagnet 14 can provide a force attracting the pedal arm 11 that prevents movement of the pedal arm 11, thus effectively deactivating the vehicle acceleration pedal 10.

Figure 2:
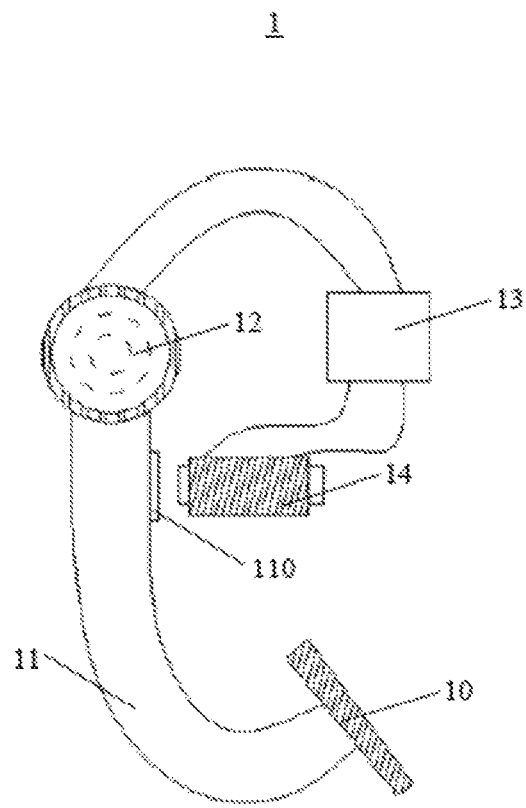
FIG. 2 is a diagrammatic view of a second embodiment of the device of FIG. 1.

In the first embodiment, the pedal arm 11 can be made from pure iron. The pure iron material is a ferroalloy with a carbon content less than 0.02%. In a second embodiment, the pedal arm 11 can be made of a hard material containing ferrous or other magnetic material. While the pedal arm 11 is made of the pure iron material, the electromagnet 14 can be arranged at any position that is near to the pedal arm 11, as shown in FIG. 1. While the pedal arm 11 is made of the hard material, the pedal arm 11 further includes a projection 110 (shown in FIG. 2). The projection 110 is made from pure iron or other magnetic material. The electromagnet 14 is arranged to be directly facing the projection 110, as shown in FIG. 2.

The processor 13 is electrically connected to the induction coil 12 and the electromagnet 14. In the embodiment, the processor 13 can be a central processing unit (CPU), a microprocessor, or other data processor chip that performs functions of the device 1.

The electromagnet 14 can produce an electromagnetic force, which strongly attracts the pedal arm 11 when the electromagnet 14 is powered on. The magnetic force produced by the electromagnet 14 disappears when the electromagnet 14 is powered off. Any attractive force between the electromagnet 14 and the pedal arm 11 is reduced to zero when the magnetic force produced by the electromagnet 14 disappears.

In the embodiment, in order to more quickly reduce to zero the electromagnetic force produced by the electromagnet 14, the electromagnet 14 can be made of soft iron or silicon steel materials. That is, the electromagnet 14 can instantaneously produce a full electromagnetic force when the electromagnet 14 is powered on and such magnetic force produced by the electromagnet 14 can be reduced to zero virtually instantaneously when the electromagnet 14 is powered off.

The vehicle acceleration pedal 10 is moved down when the vehicle acceleration pedal 10 is pressed. The motion of the vehicle acceleration pedal 10 drives the pedal arm 11 to move along with the vehicle acceleration pedal 10. The downward motion of the pedal arm 11 rotates within the induction coil and cuts electromagnetic induction lines of an electromagnetic field generated by the induction coil 12, to generate an induced current.

Figure 3:
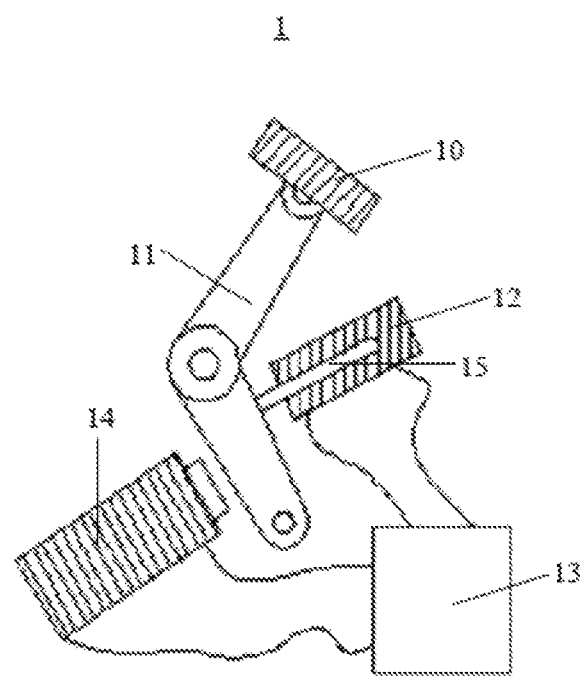
FIG. 3 is a diagrammatic view of a third embodiment of the device of FIG. 1.

FIG. 3 shows the device 1 according to a third embodiment. As shown in FIG. 3, a center of the induction coil 12 includes an induction bar 15. The induction bar 15 fastens to the pedal arm 11. The motion of the pedal arm 11 makes the induction bar 15 quickly cut the electromagnetic induction lines of the electromagnetic field generated by the induction coil 12 to generate the induced current.

In the embodiment, a magnitude of the generated induced current is positively correlated with the speed in step of the vehicle acceleration pedal 10. For example, the magnitude of the generated induced current is larger if a driver presses violently on the vehicle acceleration pedal 10 whereas the magnitude of the generated induced current is smaller if a driver presses the vehicle acceleration pedal 10 slowly.

The processor 13 can receive the generated induced current and determine whether the generated induced current is larger than a predefined current. If the generated induced current is larger than the predefined current, the processor 13 controls the electromagnet 14 to be powered on. The electromagnet 14 attracts the pedal arm 11 when the electromagnet 14 is powered on, which prevents the vehicle acceleration pedal 10 being rapidly or violently pressed. It is assumed that rapidly or violently pressing the pedal and pedal arm can be considered a driver error. Thereby a misoperation of the vehicle acceleration pedal 10 can be prevented. If the generated induced current is smaller than the predefined current, the processor 13 does not supply power to the electromagnet 14, thus the vehicle acceleration pedal 10 can be pressed as normal.

In at least one embodiment, a magnitude of the current supplied to the electromagnet 14 is positively correlated with a magnitude of the generated induced current. If the generated induced current is larger, a current supplied by the processor 13 to the electromagnet 14 is larger, thus the strength of magnetism generated by the electromagnet 14 is greater as against the pushing foot of the driver. The vehicle acceleration pedal 10 is thereby protected from being pressed wrongly, which can prevent misoperation of the vehicle acceleration pedal 10 when the vehicle brake pedal; which is more likely to be pressed harder or violently, was the intended target of the operation.

In other embodiments, the device 1 further includes an alarm device 15 (shown in FIG. 1). The alarm device can warn the driver audibly. The alarm device 15 further can prompt different audio messages to the driver according to the strength of magnetism generated by the electromagnet 14. For example, the alarm device 15 can prompt an audio message containing content "Brake not throttle!" which indicates misoperation of the vehicle acceleration pedal when a degree of the magnetism generated by the electromagnet 14 is greater than a predefined degree of magnetism. The alarm device 15 can prompt an audible warning to the driver containing content indicating Please press brake when the degree of magnetism generated by the electromagnet 14 is not more than the predefined degree of magnetism.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in particular the matters of shape, size, and arrangement of parts within the principles of the present disclosure, up to and including the full extent established by the broad general meaning of the terms used in the claims.

What is claimed is:

1. A device preventing misoperation of a vehicle acceleration pedal, comprising:
    an induction coil;
    a pedal arm being made from a magnetic material, one end of the pedal arm fastening to the vehicle acceleration pedal, the other end of the pedal arm inserting into the induction coil;
    an electromagnet; and
    a processor electrically connected to the induction coil and the electromagnet;
    wherein the pedal arm is magnetically attracted toward the electromagnet when the electromagnet is powered on by the processor, thus effectively deactivating the vehicle acceleration pedal;
    wherein the pedal arm is driven to move along with the vehicle acceleration pedal when the vehicle acceleration pedal is pressed, the downward motion of the pedal arm rotates the pedal arm within the induction coil and cuts electromagnetic induction lines of an electromagnetic field generated by the induction coil to generate an induced current;
    wherein the processor receives the generated induced current, and further determines whether the generated induced current is larger than a predefined current;
    wherein the processor determines to power on the electromagnet if the generated induced current is larger than the predefined current; and
    wherein a magnitude of current supplied by the processor to the electromagnet is positively correlated with a magnitude of the generated induced current.

2. The device of claim 1, wherein a center of the induction coil comprises an induction bar; the induction bar fastens to the pedal arm; the motion of the pedal arm drives the induction bar to quickly cut the electromagnetic induction lines of the electromagnetic field generated by the induction coil to generate the induced current.

3. The device of claim 2, wherein the pedal arm is made of a pure iron material.

4. The device of claim 3, wherein the electromagnet is arranged at any position which is near to the pedal arm.

5. The device of claim 2, wherein the pedal arm is made of a hard metal material containing ferrous material.

6. The device of claim 5, wherein the pedal arm further comprises a projection, the electromagnet is arranged to be directly facing the projection.

7. The device of claim 6, wherein the projection is made of a pure iron material.

8. The device of claim 6, wherein a magnitude of the generated induced current is positively correlated with a speed of stepping on the vehicle acceleration pedal.

9. The device of claim 1, further comprising an alarm device for warning the driver audibly.

10. The device of claim 1, further comprising an alarm device, wherein the alarm device prompts different audio messages according to strength of magnetism generated by the electromagnet.

11. The device of claim 10, wherein the alarm device prompts an audio message containing content indicating misoperation of the vehicle acceleration pedal if a degree of the magnetism generated by the electromagnet is greater than a predefined degree of magnetism.

12. The device of claim 10, wherein the alarm device prompts an audio message containing content indicating please press brake if a degree of the magnetism generated by the electromagnet is not more than the predefined degree of magnetism.

13. The device of claim 1, wherein the magnetic force produced by the electromagnet disappears when the electromagnet is powered off, any attraction between the electromagnet and the pedal arm is reduced to zero when the magnetic force produced by the electromagnet disappears.

14. The device of claim 13, wherein the electromagnet is made of soft iron or silicon steel materials to more quickly reduce to zero the electromagnetic force produced by the electromagnet.

* * * * *